US005311016A

United States Patent [19]

Villa-Aleman

[11] Patent Number: 5,311,016

[45] Date of Patent: May 10, 1994

[54] APPARATUS FOR PREPARING A SAMPLE FOR MASS SPECTROMETRY

[75] Inventor: Eliel Villa-Aleman, Aiken, S.C.

[73] Assignee: The United States of America as represented by the United State Department of Energy, Washington, D.C.

[21] Appl. No.: 933,151

[22] Filed: Aug. 21, 1992

[51] Int. Cl.$^5$ .......... B01D 59/44; H01J 49/00

[52] U.S. Cl. .......... 250/288; 250/282; 250/423 R

[58] Field of Search .......... 250/281, 282, 288, 423 R

[56] References Cited

U.S. PATENT DOCUMENTS

| | | | |
|---|---|---|---|
| 3,895,231 | 7/1975 | Sodal et al. | 250/288 |
| 3,992,626 | 11/1976 | Bursack | 250/288 |
| 4,018,241 | 4/1977 | Sodal et al. | 250/288 |
| 4,201,913 | 5/1980 | Bursack et al. | 250/288 |
| 4,618,774 | 10/1986 | Hascal et al. | 250/364 |
| 4,855,594 | 8/1989 | Kimock et al. | 250/282 |
| 4,987,345 | 1/1991 | Stromberg et al. | 250/423 R |

*Primary Examiner*—Bruce C. Anderson
*Attorney, Agent, or Firm*—Brian R. Tumm; Harold M. Dixon; William R. Moser

[57] ABSTRACT

An apparatus for preparing a sample for analysis by a mass spectrometer system. The apparatus has an entry chamber and an ionization chamber separated by a skimmer. A capacitor having two space-apart electrodes followed by one or more ion-imaging lenses is disposed in the ionization chamber. The chamber is evacuated and the capacitor is charged. A valve injects a sample gas in the form of sample pulses into the entry chamber. The pulse is collimated by the skimmer and enters the ionization chamber. When the sample pulse passes through the gap between the electrodes, it discharges the capacitor and is thereby ionized. The ions are focused by the imaging lenses and enter the mass analyzer, where their mass and charge are analyzed.

9 Claims, 1 Drawing Sheet

APPARATUS FOR PREPARING A SAMPLE FOR MASS SPECTROMETRY

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to mass spectrometry. In particular, the present invention relates to an apparatus for improving the signal-to-background ratio in mass spectrometry.

2. Discussion of Background:

The ionization source is an integral part of mass spectrometry instrumentation. Resonance-enhanced multiphoton ionization (REMPI), electron impact ionization (EI), chemical ionization, etc. are techniques available to the mass spectroscopist. These techniques have advantages and disadvantages depending on the particular application. Some molecules or atoms, particularly the noble gases, are extremely difficult to ionize, or the ionization efficiency is too low, requiring large samples for analysis.

In using a mass spectrometer to analyze a gas sample, traces of a previous sample may interfere with subsequent measurements. Molecules may remain within the system, adhering to the walls of the system and then desorb during subsequent analyses. These residual molecules produce the so-called "memory" effect, that is, a form of measurement "noise" or interference with a subsequent measurement caused by traces of previous samples. Memory effects are difficult to eliminate. The decreased signal-to-background ratio resulting from memory effects may invalidate or at least compromise subsequent measurements. They are particularly troublesome when analyzing small volume or low-concentration samples. Moreover, when the residual gas is the same as that being measured in a subsequent measurement, the effect is particularly troublesome. Hydrogen, nitrogen, water, and carbon dioxide molecules are known to be especially difficult to remove.

A number of techniques are available to improve the sensitivity of mass spectrometer measurements. The signal-to-background ratio can be increased by increasing the concentration of the sample. If a sufficient amount of the sample is available, this can be done simply by increasing the amount of sample gas introduced into the system. Vacuum pumps can purge the system between measurements to reduce the background signal. However, a vacuum purge may not remove molecules that adhere to the walls of the system. A neutral background gas may be pumped through the system between sample measurements to help detach and remove any residual molecules adhering to the walls.

Other techniques involve pulsing the sample gas into the vacuum chamber of a mass spectrometer. Kimock, et al. (U.S. Pat. No. 4,855,594) use sample gas pulses with a density high enough to substantially sweep residual background gas from the path of the pulse, thereby increasing the system's signal-to-background ratio for signal detection. The pulse frequency is adjusted to maintain a quasi-continuous flow of sample gas through the vacuum chamber.

Bursack, et al. (U.S. Pat. No. 4,201,913) describe a valve that pulses to admit small volumes of sample gas to an antechamber disposed between the sample stream and the high vacuum enclosure of a mass spectrometer. The duration and frequency of the pulses are controlled so that sample flow into the high vacuum enclosure remains essentially constant. Bursack (U.S. Pat. No. 3,992,626) uses pulsed gas samples to a mass spectrometer for use with atmospheric gases. The pulse duration and frequency are chosen so that the amount of gas admitted during each pulse does not exceed the removal capacity of an ion-getter pump in the interval before the next pulse.

Implementation of these techniques generally requires relatively large samples. It would be advantageous, particularly for small and difficult-to-ionize samples, to have a high-energy, pulsed ion source that could be activated by a small packet of gas produced by a pulsed valve. If desired, the sample could be diluted with a carrier gas such as argon, neon, xenon, and so forth. For a small, pulsed sample, the residual background molecules would not contribute significantly to the signal produced by the sample.

SUMMARY OF THE INVENTION

According to its major aspects and broadly stated, the present invention is an apparatus for preparing a gaseous sample for analysis by a mass spectrometer. The apparatus includes an ion source that is activated by a small pulse of gas containing the sample. The apparatus has an entry chamber with an entry port and an ionization chamber with an exit port. The two chambers are separated by a skimmer. A capacitor having two spaced-apart electrodes, defining a gap, is disposed in the ionization chamber together with one or more ion-imaging lenses. A pulsed valve is disposed at the entry port and a mass analyzer is operatively connected to the exit port. By "pulsed valve", it is meant that the valve opens and closes to transfer gas in the form of discrete, small-volume samples or "packets" of gas.

The chamber is evacuated and the capacitor is charged by a power supply. The pulsed valve injects a pulse containing the sample into the entry chamber where the gas expands, is collimated by the skimmer and then enters the ionization chamber. As the pulse enters the gap between the electrodes, the gas molecules provide a conductive path causing the discharge of the capacitor. The gas pulse thus serves as a switch or trigger for the discharge of the capacitor. The capacitive discharge ionizes many of the gas molecules. The ions continue through the ionization chamber, are focused by the imaging lenses, pass through the exit port and enter the mass analyzer. There, the mass of the ions is analyzed by means well known in the art. The capacitor is recharged to prepare the system for a next gas pulse.

The amount of sample gas needed for a measurement is minimized since a short-duration, high-pressure pulse consisting mainly of a carrier gas is used to increase the density of the sample relative to the density of any residual background gas in the entry and ionization chambers. Relatively little background gas is present within the volume of the pulse and, thus, the ionized molecules entering the mass analyzer dominate the measurement and a good signal-to-background ratio is obtained. Minimizing the amount of sample gas needed for each measurement therefore reduces the "memory"

effect. Computer modeling of the sample signal can also contribute to memory effect reduction.

An important feature of the present invention is the use of the pulsed valve. The valve introduces a gas sample into the entry chamber in the form of a short duration, high density, high pressure pulse. The sample pulse has a duration, typically measured in terms of a Full Width Half Maximum (FWHM). A FWHM is the duration in time units of the pulse at a concentration of half of its maximum. The FWHM of the sample pulses used in the present invention is preferably less than approximately 100 μsec and most preferably less than approximately 50 μsec.

Another feature of the present invention is the skimmer separating the entry chamber and the ionization chamber. The skimmer has a central opening which collimates the sample pulse, so that only that portion of the pulse which reaches the opening passes into the ionization chamber. The balance of the pulse remains in the entry chamber.

Still another feature of the present invention is the capacitor, which stores electrical energy used to ionize the gas sample. The capacitor is in electrical contact with two electrodes disposed in the ionization chamber between the skimmer and the imaging lenses. The distance between the two electrodes forms a gap. The gap is narrow enough that the presence of sample gas molecules therein completes the electrical circuit and triggers the discharge of the capacitor, but wide enough that the capacitor remains charged in the absence of such molecules, even though residual background molecules may remain in the chamber. At least a portion, and preferably most of the sample pulse molecules which enter the ionization chamber pass through the gap. The discharge time constant is preferably smaller than the FWHM of the pulsed valve, in order to allow the complete discharge of the capacitor.

Other features and advantages of the present invention will be apparent to those skilled in the art from a careful reading of the Detailed Description of a Preferred Embodiment presented below and accompanied by the drawing.

DETAILED DESCRIPTION OF A PREFERRED EMBODIMENT

Figure 1:
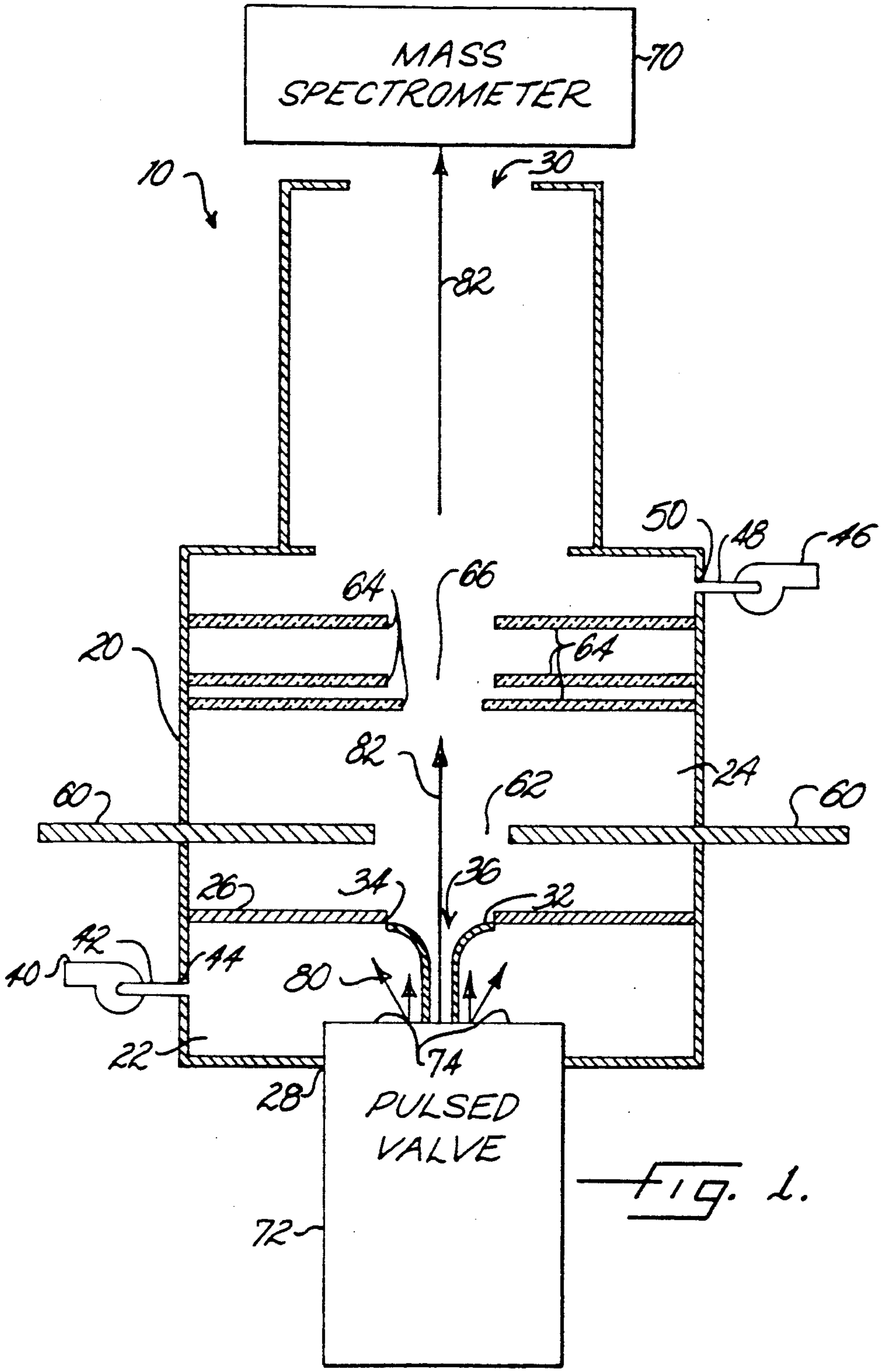
FIG. 1 is a schematic view of an apparatus according to a preferred embodiment of the present invention.

Referring now to FIG. 1, there is shown a schematic view of an apparatus according to a preferred embodiment of the present invention. Apparatus 10 includes dual chamber 20, separated into entry chamber 22 and ionization chamber 24 by divider 26. Entry chamber 22 has entry port 28 and ionization chamber 24 has exit port 30. Divider 26 has a port 34. A funnel-like skimmer 32 is mounted in port 34 of divider 26. Skimmer 32 has central opening 36 therethrough.

Vacuum pump 40 is in fluid connection with entry chamber 22 via connector 42, entering chamber 22 at port 44. Similarly, vacuum pump 46 is in fluid connection with ionization chamber 24 via connector 48, entering chamber 22 at port 50.

Electrodes 60, separated to define a gap 62, are disposed in ionization chamber 24. A power supply (not shown) is connected across electrodes 60. The capacitor formed by electrodes 60 and gap 62 has time constant T. The capacitor may take the form of a single pair of electrodes 60, as shown, or a series of paired electrodes.

Ion imaging lenses 64, separated to define gaps 66, are disposed in chamber 24 between electrodes 60 and exit port 30. Lenses 66 are known in the art, and may constitute a plurality of lenses, as shown, or a single lens.

Mass analyzer 70 is disposed at exit port 30 of ionization chamber 24 and in fluid communication therewith. Mass analyzer 70 may be a time-of-flight mass spectrometer, quadrupole mass spectrometer (QMS), magnetic sector spectrometer, Fourier Transform Mass Spectrometer (FTMS), and or other known type of mass analyzer.

Pulsed valve 72 with nozzle 74 is disposed at entry port 28 of entry chamber 22. Valve 72 injects a pulse having a Full Width Half Maximum (FWHM) preferably less than approximately 100 μsec and most preferably less than approximately 50 μsec.

To make a measurement, entry chamber 22 and ionization chamber 24 are evacuated by vacuum pumps 40 and 46, respectively, preferably to a pressure on the order of $10^{-5}$ psig or less, and the capacitor is charged by the power supply connected thereto. The gas sample to be analyzed is introduced into entry chamber 22 in the form of a short duration, high density, high pressure pulse. Pulsed valve 72 introduces the sample gas pulse into entry chamber 22 through nozzle 74. The pulse may, if desired, include a carrier gas such as argon, neon, xenon, and so forth. The pulse expands into chamber 22, as indicated generally by arrows 80, 82 and is collimated by skimmer 32. That portion of the pulse which reaches opening 36 of skimmer 32 passes into ionization chamber 24, constituting a beam of molecules moving generally as indicated by arrows 82. The balance of the pulse, indicated by arrows 80, remains in entry chamber 22.

As the sample pulse enters gap 62, some of the gas molecules contact electrodes 60, forming a conductive path therebetween. This initiates an electrical discharge between electrodes 60, discharging the capacitor and producing ions. The ions continue their passage through ionization chamber 24, passing through gaps 66 where they are focused by imaging lenses 64, pass through exit port 30 and enter mass analyzer 70. There, the mass of ions is analyzed by means well known in the art. The output of analyzer 70 is preferably a signal proportional to the amounts of the different species of ions present in the sample.

After discharge of the capacitor and at some convenient time after the ions enter mass analyzer 70, chambers 22 and 24 are evacuated and the capacitor is recharged to prepare apparatus 10 for a next sample pulse. The optimum time interval between successive pulses is a function of the transit time of the pulse through chambers 22 and 24 and the time required for mass analyzer 70 to make a measurement. This time interval thus depends on the specific configuration and arrangement of the components of apparatus 10, and is best determined by calculation or a modest degree of experimentation for any particular system as known to those of ordinary skill in the art.

The distances between nozzle 74 and skimmer 32, between skimmer 32 and electrodes 60, and between electrodes 60 and imaging lenses 64 are selected to optimize the sensitivity and response of apparatus 10. For example, the greater the distance between nozzle 74 and skimmer 32, the less sample gas enters ionization chamber 24 and the more residual gas remains in entry chamber 22. The greater the distance between skimmer 32 and electrodes 60, the less sample gas passes through gap 62 to be focused by imaging lenses 64 and enter mass analyzer 70. The more residual gas that remains in chambers 22 and 24, the more that adheres to any surfaces located therein, potentially decreasing the signal-to-background ratio of succeeding measurements.

Gap 62 between electrodes 60 is chosen so that at least a portion, and preferably most of the sample gas molecules entering ionization chamber 24 passes therethrough. Gap 62 is preferably small enough so that the presence of sample molecules therein triggers an electrical discharge between electrodes 60, but large enough that no discharge occurs in the absence of such molecules. Gaps 66 between imaging lenses 64 also are chosen so that a substantial portion, and preferably most of the ionized sample molecules reaches mass analyzer 70. Preferably, the configuration of these components is chosen to maximize the amount of the sample pulse reaching mass analyzer 70 and minimize the amount remaining in ionization chamber 24, and is best determined by a modest degree of experimentation for the particular system involved.

The capacitor discharges when the sample molecules indicated generally as arrows 82 enter gap 62, thereby ionizing those molecules. The time constant T of the capacitor is such that the discharge across electrodes 60 continues for a sufficient time interval to ionize a substantial portion of the sample molecules passing through opening 36 into ionization chamber 24. The current across gap 62—and ionization of sample molecules passing through gap 62—ceases when the capacitor is discharged. T is therefore chosen in light of the FWHM of pulsed valve 72. For the discharge to continue until substantially all the pulse has passed through gap 62, T is preferably greater than the FWHM of the pulsed valve. Most preferably, T is greater than approximately twice the FWHM. For a sample pulse with an FWHM of 100 μsec, T is preferably greater than approximately 200 μsec; for an FWHM of 25 μsec, T is preferably greater than approximately 50 μsec.

Although the amount of sample gas introduced into chamber 22 is small, the concentration of the sample pulse is high in order to obtain a good signal-to-background ratio. Furthermore, the pulse has a high density compared to the density of any residual background gas in chambers 22 and 24. Thus, relatively little background gas will be present within the volume of the pulse, increasing the sensitivity of the measurement, since the ionized molecules entering mass analyzer 70 are preferentially sample gas rather than residual background gas. That portion of the sample pulse which passes through opening 36 into ionization chamber 24 consists largely of a unidirectional beam of molecules indicated by arrows 82. This beam is focused by ion imaging lenses 64, so a substantial portion of the ionized sample molecules enter mass analyzer 70 and few remain within ionization chamber 24. That portion of the sample which remains in chambers 22, 24 is largely removed by evacuating chambers 22, 24 between measurements. If desired, a neutral background gas may be passed through chambers 22, 24 between sample measurements to help detach and remove any residual molecules adhering to the walls of the system.

To further increase the overall sensitivity of the measurement, the background ionization levels are measured between sample measurements. Since the sample is introduced as a pulse, the background signal can be readily distinguished from the signal of interest and the effects of background ionization can be eliminated from the sample signal by computer modeling.

The present invention furnishes an apparatus and method to minimize the amount of sample gas needed for a measurement. Since a short duration, high pressure pulse is used, the amount of sample gas is minimized even while the concentration remains high enough to obtain a good signal-to-background ratio. This also helps minimize the "memory" effect since less residual remains in the system.

It will be apparent to those skilled in the art that many changes and substitutions can be made to the preferred embodiment herein described without departing from the spirit and scope of the present invention as defined by the appended claims.

What is claimed is:

1. An apparatus for preparing a sample fluid for analysis with a mass spectrometer, said apparatus comprising:
- a chamber;
- a pulsed valve for injecting said sample fluid into said chamber, said pulsed valve having a pulse duration; and
- a capacitor carried within said chamber for ionizing at least a portion of said sample fluid, said capacitor having a time constant greater than said pulse duration, said sample fluid activating said capacitor when said sample fluid is proximate to said capacitor.

2. The apparatus as recited in claim 1, wherein said valve injects said sample fluid in the form of sample pulses.

3. The apparatus as recited in claim 1, wherein said capacitor has two spaced-apart electrodes and wherein said sample fluid discharges said capacitor when said sample fluid is between said electrodes whereby said sample fluid is ionized.

4. The apparatus as recited in claim 1, further comprising means for collimating said sample fluid so that said sample fluid passes proximate to said capacitor, said collimating means disposed between said valve and said capacitor.

5. An apparatus for preparing a sample for analysis with a mass spectrometer, said apparatus comprising:
- a first chamber;
- a second chamber, said second chamber in fluid communication with said first chamber;
- a pulsed valve in spaced relation to said first chamber for injecting said sample into said first chamber in the form of sample pulses, said sample pulses having a duration;
- means for collimating said sample pulses, said collimating means disposed between said first and second chambers; and
- a capacitor carried within said first chamber for ionizing at least a portion of said sample, said capacitor having a time constant greater than said pulse duration, said sample pulses activating said ionizing means when said sample pulses are proximate to said ionizing means.

6. The apparatus as recited in claim 5, wherein said capacitor has two spaced-apart electrodes and a time constant and wherein said collimating means directs at least a portion of said sample pulses between said spaced-apart electrodes of said capacitor so that said portion can discharge said capacitor whereby said portion is ionized.

7. The apparatus as recited in claim 5, wherein said collimating means is a skimmer.

8. A method for preparing a gaseous sample for analysis with a mass spectrometer, said method comprising the steps of:

injecting said sample into a chamber as a sample pulse;

applying a charge to a pair of spaced-apart electrodes; and passing said sample pulse between said pair of electrodes, said sample pulse discharging said electrodes so that said sample pulse is ionized.

9. The method as recited in claim 8, further comprising the step of collimating said sample pulse so that at least a portion of said sample pulse is directed proximate to said capacitor.

* * * * *